(12) United States Patent
Spodak

(10) Patent No.: US 9,129,270 B2
(45) Date of Patent: *Sep. 8, 2015

(54) PORTABLE E-WALLET AND UNIVERSAL CARD

(75) Inventor: Douglas Spodak, Bala Cynwyd, PA (US)

(73) Assignee: GoNow Technologies, LLC, Bound Brook, NJ (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/715,977

(22) Filed: Mar. 2, 2010

(65) Prior Publication Data

US 2011/0218911 A1 Sep. 8, 2011

(51) Int. Cl.
*G06Q 40/00* (2012.01)
*G06Q 20/10* (2012.01)

(52) U.S. Cl.
CPC .................................. *G06Q 20/105* (2013.01)

(58) Field of Classification Search
USPC .......................................................... 705/41
See application file for complete search history.

(56) References Cited

U.S. PATENT DOCUMENTS

| | | | |
|---|---|---|---|
| 4,491,725 A | 1/1985 | Pritchard | |
| 4,689,478 A | 8/1987 | Hale et al. | |
| 5,276,311 A | 1/1994 | Hennige | |
| 5,590,038 A | 12/1996 | Pitroda | |
| 5,594,493 A | 1/1997 | Nemirofsky | |
| 5,748,737 A | 5/1998 | Daggar | |
| 5,884,271 A | 3/1999 | Pitroda | |
| 5,939,699 A | 8/1999 | Perttunen et al. | |
| 6,131,811 A * | 10/2000 | Gangi | 235/380 |
| 6,161,005 A | 12/2000 | Pinzon | |
| 6,336,098 B1 | 1/2002 | Fortenberry et al. | |
| 6,607,136 B1 | 8/2003 | Atson et al. | |
| 6,617,975 B1 | 9/2003 | Burgess | |
| 6,641,050 B2 | 11/2003 | Kelley et al. | |
| 6,715,679 B1 | 4/2004 | Infosino | |
| 6,718,240 B1 | 4/2004 | Suda et al. | |
| 6,736,322 B2 | 5/2004 | Gobburu et al. | |
| 6,769,607 B1 | 8/2004 | Pitroda et al. | |
| 6,785,595 B2 | 8/2004 | Kominami et al. | |
| 6,925,439 B1 | 8/2005 | Pitroda | |
| 6,967,562 B2 | 11/2005 | Menard et al. | |

(Continued)

FOREIGN PATENT DOCUMENTS

WO   WO 2005/086102 A1   9/2005
WO   WO 2007/028634 A1   3/2007

OTHER PUBLICATIONS

International Patent Application No. PCT/US2011/63319: International Search Report and Written Opinion dated Apr. 25, 2012, 15 pages.

(Continued)

*Primary Examiner* — Hani M Kazimi
*Assistant Examiner* — Hatem M Ali
(74) *Attorney, Agent, or Firm* — Baker & Hostetler LLP

(57) ABSTRACT

Universal cards are used in place of all the other traditional cards which a person may want to carry. The universal card can include a short range communications transceiver to communicate with a mobile device. The mobile device can include a user interface and an e-wallet application so that the user can interface with the e-wallet application for programming the universal card via the short range communication link. Once programmed, the universal card emulates a function of a traditional card.

16 Claims, 10 Drawing Sheets

(56) References Cited

U.S. PATENT DOCUMENTS

| | | | |
|---|---|---|---|
| 7,003,495 B1 | 2/2006 | Burger et al. | |
| 7,097,108 B2 | 8/2006 | Zellner et al. | |
| 7,128,274 B2 | 10/2006 | Kelley et al. | |
| 7,152,783 B2* | 12/2006 | Charrin | 235/379 |
| 7,213,742 B1 | 5/2007 | Birch et al. | |
| 7,343,317 B2 | 3/2008 | Jokinen et al. | |
| 7,499,889 B2 | 3/2009 | Golan et al. | |
| 7,591,416 B2 | 9/2009 | Blossom | |
| 7,681,232 B2 | 3/2010 | Nordentoft et al. | |
| 8,082,575 B2 | 12/2011 | Doughty et al. | |
| 8,200,582 B1 | 6/2012 | Zhu | |
| 8,326,758 B2 | 12/2012 | Bennett | |
| 2002/0004746 A1 | 1/2002 | Ferber et al. | |
| 2002/0198777 A1 | 12/2002 | Yuasa | |
| 2003/0055785 A1 | 3/2003 | Lahiri | |
| 2003/0166400 A1 | 9/2003 | Lucas | |
| 2004/0019564 A1 | 1/2004 | Goldthwaite et al. | |
| 2004/0159700 A1* | 8/2004 | Khan et al. | 235/380 |
| 2005/0021400 A1 | 1/2005 | Postrel | |
| 2005/0101314 A1 | 5/2005 | Levi | |
| 2005/0116026 A1 | 6/2005 | Burger et al. | |
| 2005/0173519 A1 | 8/2005 | Gatto | |
| 2005/0194452 A1 | 9/2005 | Nordentoft et al. | |
| 2006/0081702 A1 | 4/2006 | Nandakumar | |
| 2006/0190412 A1 | 8/2006 | Ostroff | |
| 2007/0045401 A1 | 3/2007 | Sturm | |
| 2007/0189581 A1 | 8/2007 | Nordentoft et al. | |
| 2007/0252010 A1 | 11/2007 | Gonzalez et al. | |
| 2007/0254712 A1* | 11/2007 | Chitti | 455/558 |
| 2007/0278291 A1 | 12/2007 | Rans et al. | |
| 2007/0288313 A1 | 12/2007 | Brodson et al. | |
| 2008/0059379 A1 | 3/2008 | Ramaci et al. | |
| 2008/0120186 A1 | 5/2008 | Jokinen et al. | |
| 2008/0147546 A1 | 6/2008 | Weichselbaumer et al. | |
| 2009/0103732 A1 | 4/2009 | Benteo et al. | |
| 2009/0199206 A1 | 8/2009 | Finkenzeller et al. | |
| 2009/0261166 A1 | 10/2009 | Lawson et al. | |
| 2010/0057580 A1 | 3/2010 | Raghunathan | |
| 2010/0280948 A1 | 11/2010 | Cohen | |
| 2011/0062242 A1 | 3/2011 | Cowcher | |
| 2011/0140841 A1 | 6/2011 | Bona et al. | |
| 2011/0218911 A1 | 9/2011 | Spodak | |
| 2011/0219026 A1 | 9/2011 | Schonemann | |

OTHER PUBLICATIONS

International Patent Application No. PCT/US2013/023149: International Search Report and Written Opinion dated Jun. 5, 2013, 40 pages.

Smart cards: Anonymus; Retail Delivery strategies 9 (1998):5-27.

Smart cards Do not have all the answers: Motoco Rich and Gerge Graham Financial Times. Fianancial Post[Toronto,ont] Aug. 27, 1996:53.

AT & T joins banks in Mondex line-up: Anonymus. Financial Technology International Bulletin 13.12 (Aug. 1996): 1.

* cited by examiner

US 9,129,270 B2

PORTABLE E-WALLET AND UNIVERSAL CARD

TECHNICAL FIELD

The presently disclosed subject matters relates to universal cards, mobile applications, and mobile devices such as mobile phones, Personal Digital Assistants (PDAs), iPods, and similar mobile devices. More particularly, the subject matter relates to a universal card which can be used at any type of terminal equipped with a magnetic stripe reader or a short range wireless communication capability.

BACKGROUND

People carry many types of cards with them every day. The cards include credit cards, debit cards, drivers' licenses, transportation passes, building access cards, and many other types of cards. These cards are typically carried in a wallet or purse. A person may need to use any number of cards during the course of a day. Since people do not know which of the cards will be needed on any given day, most people carry all the cards that they may need with them every day. With the proliferation of card-capable terminals, people can end up carrying an inordinate amount of cards with them every day.

Many people also carry mobile devices with them, such as cell phones, PDAs, and many other types of mobile devices. Mobile devices increasingly have short range communication capabilities, such as near field communication (NFC) capabilities or Bluetooth capabilities.

A person that carries a wallet or purse also has to secure the contents of the wallet or purse at all times to protect against theft and fraud. If a card is lost or stolen, it can be used in unauthorized ways, leading to identification theft, fraud, or financial loss. In addition, as many transactions are increasingly performed without the need for physically possessing the card (e.g., online purchases), the mere exposure of the information found on a card to an unauthorized person is a risk to the card holder.

There is a need to reduce the number of cards carried by a person, and an opportunity to address that need using the short range communication capabilities of a mobile device which that person carries. In addition, there is a need to secure cards and card information so that cards and card information is not exposed to unauthorized people.

SUMMARY

To reduce the number of cards carried by a person, a universal card and short range communication enabled mobile device can be used in place of all the other cards which the person may want to carry. The universal card can include a short range communications transceiver to communicate with a mobile device. The mobile device can include a user interface and an e-wallet application so that the user can interface with the e-wallet application for programming the universal card via the short range communication link. Once programmed, the universal card emulates a function of a traditional card, such as emulating the magnetic stripe of the traditional card, the NFC communication of the traditional card, the radio transmission of the traditional card, or any other function.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION OF ILLUSTRATIVE EMBODIMENTS

Figure 1:
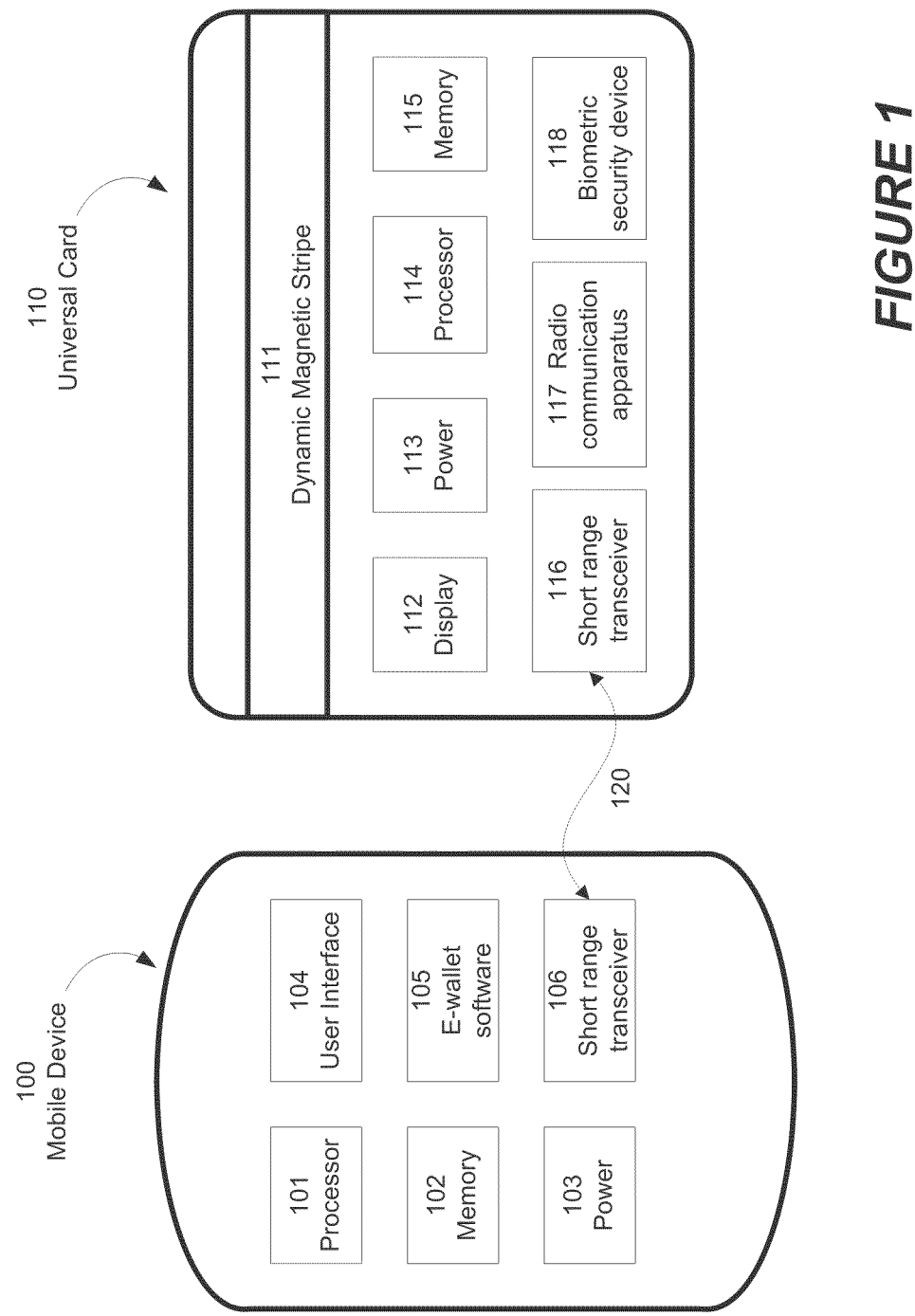
FIG. 1 depicts an exemplary system including a mobile device and a universal card.

Referring to FIG. 1, an exemplary system is depicted with a mobile device 100 and a universal card 110. The mobile device 100 can be any number of devices, including a cell phone, a PDA, an iPod, an NFC-specialized device, or any other type of mobile device. An NFC-specialized device is a device that provides for the user to be able to communicate with NFC terminals, such as making a contactless payment, and would also provide a user with a user interface for interacting with an NFC-enabled universal card. The mobile device 100 may include any number of components, such as a processor 101, memory 102, a power source 103, a user interface 104, and a short range transceiver 106. Memory 102 can be any type of computer storage media in the form of volatile and/or nonvolatile memory such as read only memory (ROM) and random access memory (RAM). Processor 101 can operate on data and/or software applications available in the memory 102. The user interface 104 can include any components for user input, such as a keyboard, a mouse, a trackball, a touch screen display, or any similar component. The user interface 104 can also include security features on the mobile device, such as a PIN/password login, a fingerprint scanner, other biometric readers, or similar security features.

The mobile device 100 also includes an e-wallet application 105 which is executable by the processor 101. The e-wallet application 105 can be pre-installed on the mobile device 100 by the manufacturer of the mobile device 100. The e-wallet application 105 can also be installed by the user either by downloading it directly to the mobile device 100, by downloading the e-wallet application 105 over-the-air via a wireless data connection, or by inserting a memory card containing the e-wallet application 105.

The e-wallet application 105 allows the user to input information about traditional cards for storage in the memory 102. Information about traditional cards can include an account name, an account number, an expiration date, a card verification value 2 (CVV2), the image of the traditional card, the information which would be stored on the magnetic stripe of the traditional card, and any other information necessary to emulate the card. The information about traditional cards can also be stored in a remote location, such as a trusted service manager (not shown), which stores the information and provides the information to the mobile device 100 on demand via wireless data communication. In this case, the e-wallet application 105 would interface with the remote location to request and receive the information.

The e-wallet application 105 can also be used to program the universal card 110 by allowing the user to select a traditional card for the universal card to emulate. Once the user selects a card for emulation, the e-wallet application 105 causes the mobile device to communicate with the universal card and to transmit the information necessary for the universal card to emulate the selected traditional card.

In another universal card embodiment, the information about the traditional card could be stored in the memory 115 of the universal card 110. In this embodiment, if the universal card 110 has a user interface with sufficient capabilities, the user may be able to program the card by using the user interface on the universal card 110.

The short range transceiver 106 can be configured to communicate via any type of short range communication link, such as an NFC communication link or a Bluetooth communication link. The mobile device 100 may be manufactured with the short range transceiver 106. However, not all mobile devices are initially manufactured with short range transceivers. The short range transceiver 106 may be located on a memory card compatible with a memory slot of the mobile device 100. In this situation, the memory card with the short range transceiver 106 is inserted into the memory slot (not shown) of the mobile device 100 such that the mobile device can transmit and receive information using a short range communication link corresponding to the short range transceiver 106.

Another issue with the short range transceiver 106 may arise if the short range transceiver 106 of the mobile device and the short range transceiver 116 of the universal card 110 are not configured for the same type of short range communication. For example, mobile device 100 may have a Bluetooth transceiver, and the universal card 110 may have an NFC transceiver. In such a situation, the short range transceiver 106 would be a two-type transceiver, capable of communicating via both types of short range communication. In the example above, the short range transceiver 106 would be capable of receiving information via the Bluetooth link from the mobile device 100, and also capable of sending that information via the NFC link to the universal card 110. The short range transceiver 106 would also be capable of communicating in the opposite direction, receiving information via the NFC link from the universal card 110 and sending that information via the Bluetooth link to the mobile device 100. One example of a two-type transceiver is a MyMax sticker produced and sold by TwinLinx of France. The MyMax sticker can be attached to the housing of a Bluetooth-enabled device, can communicate with the device via a Bluetooth connection, and can communicate via an NFC connection with an NFC-enable device.

Also depicted in FIG. 1 is a universal card 110. The universal card 110 may include components such as a display 112, a power source 113, a processor 114, and memory 115. Each of those components are similar in function to the corresponding components of the mobile device 100, except that the component of the universal card 110 may be physically configured differently so as to fit in the shape of the universal card 110. For example, the display 112 of the universal card 110 may be integrated into universal card 110 via hot lamination processes and standard inlay constructs so that the universal card 110 will be the approximate shape and size of a traditional credit card and generally compliant with ISO 7810 standards.

The universal card 110 may also include a dynamic magnetic stripe 111 which can be configured to emulate the magnetic stripe of any traditional card. The standard magnetic stripe format is defined by ISO/IEC 7810:2003, and its extensions, including ISO/IEC 7811-1:2002 through ISO/IEC 7811-9:2008, and ISO/IEC 7813:2006, each of which are hereby incorporated by reference. Traditional magnetic stripes include a series of tiny bar magnets which can be magnetized in either a north- or south-pole direction. When the polarity of the bars aligns in the same direction, the card is blank. To write data to the card, the polarity of a bar is reversed so that the north pole is facing the north pole of the adjacent bar (N-N) or the south pole is facing the south pole (S-S). This causes a change in the magnetic field that can be detected by a card reader. The two possible flux reversals, N-N or S-S, can represent two different information states, which corresponds nicely to the binary system (ones and zeros) used by computers.

Figure 2:
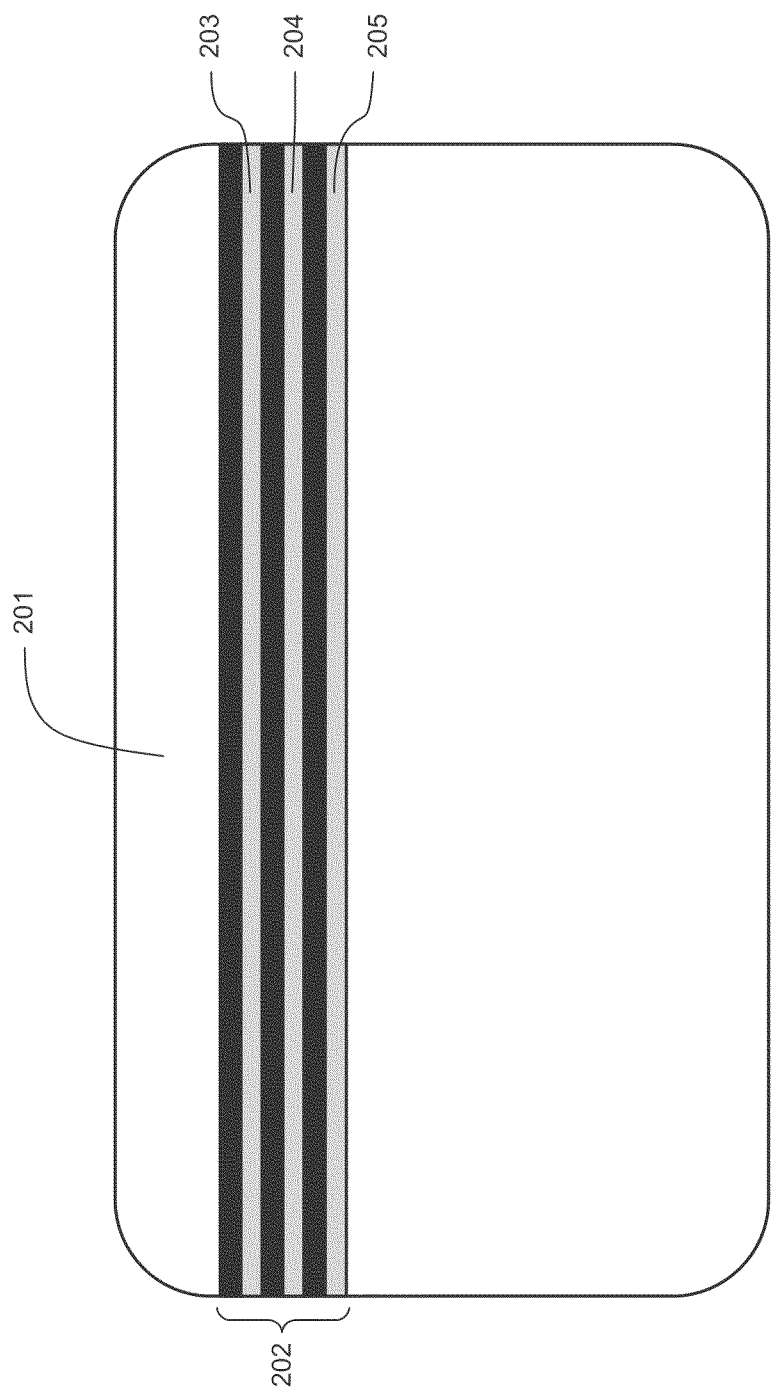
FIG. 2 depicts a traditional card with a static magnetic stripe.

Magnetic stripes have three standard track layouts: Track 1, Track 2, and Track 3. Referring to FIG. 2, depicted is a traditional card 201 with a static magnetic stripe 202. The static magnetic stripe includes each of Tracks 1, 2, and 3, shown as 203, 204, and 205, respectively. Each of the track layouts are 0.110 inches high. Track 1 has 210 bits per inch (bpi) with room for 79 characters of 7 bits each (6 data bits, plus 1 parity bit). Track 2 has 75 bpi with room for 40 characters of 5 bits each (4 data bits, plus 1 parity bit). Track 3 has 210 bpi with room for 107 numeric digits. Tracks 1 and 2 have a standard for the data content contained in each track. Those standards are shown in Tables 1 and 2 below. In contrast, Track 3 does not have a standard for the data content in the track, and can be used for proprietary data formats.

TABLE 1

Standard Track 1 Data Content in Magnetic Stripe of Financial Cards

| Data Field | Content of Data Field |
| --- | --- |
| Start sentinel | 1 byte (the % character) |
| Format code | 1 byte alpha ("A" is reserved for proprietary use of the card issuer; "B" is a standard for financial institutions; "C"-"M" are reserved for use by ANSI; and "N"-"Z" are available for use by individual card issuers) |
| Primary Account number | Up to 19 characters |
| Separator | 1 byte (the ˆ character) |
| Country code | 3 bytes (optional) |
| Surname | Variable number of bytes |
| Surname separator | 1 byte (the/character) |
| First name or initial | Variable number of bytes |

TABLE 1-continued

Standard Track 1 Data Content in Magnetic Stripe of Financial Cards

| Data Field | Content of Data Field |
|---|---|
| Space | 1 byte (used only when more data follows the first name or initial) |
| Middle name or initial | Variable number of bytes |
| Period | 1 byte (the . character; used only when followed by a title) |
| Title | Variable number of bytes (optional) |
| Separator | 1 byte (the ^ character) |
| Expiration date or separator | 4 bytes (YYMM format), or a 1-byte separator if non-expiring card |
| Discretionary data | Variable number of bytes (optional; can be used by the card issuer) |
| End sentinel | 1 byte (the ? character) |
| Longitudinal redundancy check | 1 byte |

TABLE 2

Standard Track 2 Data Content in Magnetic Stripe of Financial Cards

| Data Field | Content of Data Field |
|---|---|
| Start sentinel | 1 byte (the ; character) |
| Primary account number | Up to 19 bytes |
| Separator | 1 byte (the = character) |
| Country code | 3 bytes (optional) |
| Expiration date or separator | 4 bytes (YYMM format), or a 1-byte separator if non-expiring card |
| Discretionary data | Variable number of bytes (optional; can be used by the card issuer) |
| End sentinel | 1 byte (the ? character) |
| Longitudinal redundancy check | 1 byte |

Traditional financial cards from the banking industry, such as credit cards and debit cards, typically use both Tracks 1 and 2, with Track 2 using format code "A" or "B". Some traditional credit and debit cards do not have Track 3 physically present on the cards as its data is not necessary for the cards' use. Eliminating Track 3 can reduce the physical size of the magnetic stripe. Traditional financial cards usually include all of the data listed in Tables 1 and 2.

Traditional gift cards typically use Track 2 with format code "B". Those cards usually have a unique account number, but usually do not contain the name of the user in the track. Some traditional gift cards can include the amount available at the time of the original purchase in the magnetic track, and some will store the current balance on the card so that the card can be used at any terminal. However, most traditional gift cards do not have any value data stored on the card; the card merely stores the unique account number, and each terminal at the store is connected to a database, where the value of the card is associated with the unique account number.

Traditional loyalty cards typically use Track 2 with format code "B". Like traditional gift cards, traditional loyalty cards typically include only a unique account number without storing any data about the user or any monetary value associated with the card. Most terminals which accept loyalty cards are connected to a central database which associates data about the user with the unique account number. Some traditional loyalty cards also include a barcode printed on the face of the card so that the card can be read by a barcode scanner. The barcode is representative of the unique account number of the user, and typically has no other data encoded in the barcode itself.

Many driver's licenses issued in the United States have a magnetic stripe on them. Driver's licenses typically include Tracks 1, 2, and 3. The data content of Tracks 1 and 2 are shown in Table 3. The data content of Track 3 is not entirely standardized, but Track 3 typically includes at least some of the following data categories: template number, security number, postal code, class, restrictions, endorsements, sex, height, weight, hair color, eye color, ID number, error correction, and security field.

TABLE 3

Standard Track 1 and Track 2 Data Content of US Driver's Licenses

| Track 1 Data Fields | Content of Data Field |
|---|---|
| Start sentinel | 1 character (usually the % character) |
| State or province | 2 characters |
| City | Up to 13 characters (variable length) |
| Field separator | 1 character (usually the ^ character), unless the City field is maxed out |
| Last name | Variable length |
| Field separator | 1 character (usually the $ character) |
| First name | Variable length |
| Field separator | 1 character (usually the $ character) |
| First name | Variable length |
| Field separator | 1 character (usually the ^ character) |
| Home address | Variable length (usually house number and street) |
| Field separator | 1 character (usually the ^ character) |
| Discretionary data | Variable length |
| Start sentinel | 1 character (usually the ^ character) |

| Track 2 Data Fields | Content of Data Field |
|---|---|
| ISO issuer ID number | 6 character |
| License/ID number | 8 character |
| Field separator | 1 character (usually the = character) |
| Expiration date | 4 characters (usually YYMM format) |
| Birth date | 8 characters (usually YYYYMMDD format) |
| License/ID number overflow | Variable length |

Traditional access cards are used to provide access to the card holder to a building or other secure area. Traditional access cards typically use either a magnetic stripe or a radio transmitter to convey information to a terminal. When using a magnetic stripe, the data encoded on the magnetic stripe typically includes the user's name, an ID number associated with the user, and an access level relating to where and when the user is allowed access. When using a radio transmitter, the access card typically only includes an ID number associated with the user, and the access terminal is connected to a database which contains information about the user and the access level based on the ID number. Radio transmitters in access cards can either be "active" radio transmitters (powered by a power source on the card), or "passive" radio transmitters (powered by the radio receiver in the terminal when the card is brought into close proximity with the terminal).

Referring back to FIG. 1, universal card 110 can also include a radio communications apparatus 117 to emulate an access card which uses a radio communications apparatus. Radio communications apparatus 117 can either be a passive radio transmitter, or an active radio transmitter powered by power source 113. The ID number transmitted by the radio communications apparatus 117 can be programmed so that the universal card can programmed to emulate different traditional access cards. When programming the universal card 110 to emulate an access card, it may be desirable to verify the identity of the user prior to programming the universal card 110. Examples of user verification are discussed below.

Other types of traditional cards exist and can be emulated by universal card 110. Examples of dynamic magnetic stripes are shown in US Patent Application Publication 2005/0194452, applied for by Nordentoft et al, and 2007/0189581, applied for by Nordentoft et al. In these examples, individually inducible transducer coils are positioned within a universal card and are configurable to emulate the static magnets in a traditional magnetic stripe. The dynamic magnetic stripe 111 of the universal card can be configured to emulate any traditional static magnetic stripe, including any data or data format used by a static magnetic stripe. Thus, even if a data content format is not discussed here, dynamic magnetic stripe 111 would be capable of emulating the data content format not discussed here.

Universal card 110 may include a biometric security device 118, such as a fingerprint reader, a microphone for voice identification, or other device for input during biometric identification. The use of such biometric identification for security is discussed below.

Figure 3:
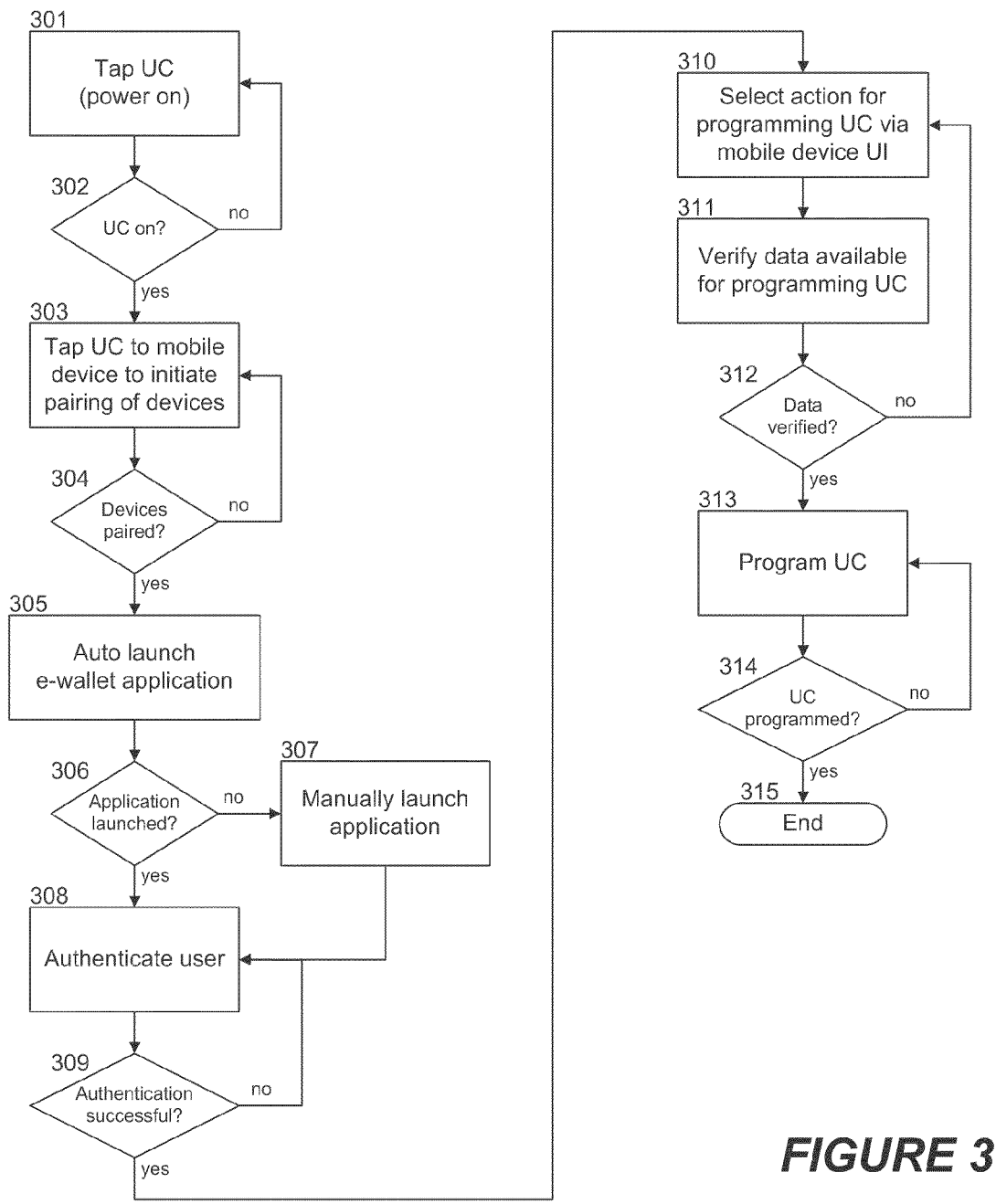
FIG. 3 depicts a flowchart process for programming a universal card.

Referring now to FIG. 3, depicted is a flowchart process for programming a universal card. To initiate power on the universal card (UC) the user may be required to take an action that may include pushing a button on card to turn it "on", is tapped 301, or any other similar technique. The universal card's power is verified 302. If the power is not on, the user will repeat the action to initiate power 301 on the universal card again. If the power is on, the universal card and the mobile device are paired 303, establishing the short range communication link 120 (as shown in FIG. 1). The pairing is verified 304, with the pairing 303 attempted again if the pairing is not successful. Once paired, an e-wallet application on the mobile device is automatically launched 305. If the e-wallet application is not automatically launched 306, it can be manually launched 307 on the mobile device.

Before allowing access to view, change or modify the financial data associated with the e-wallet program 105 on the mobile device 100 or on the universal card 110, the user must first be authenticated 308. Authentication can take a number of forms. One form of authentication can be verification of something that the user has in their possession. In this context, one security feature could be that the mobile device 100 can only be paired with one universal card 110, and the universal card 110 will only pair to one mobile device 100. For example, if a user's mobile device 100 is lost or stolen, the universal card 110 will not pair with any other mobile device. Thus, any personal card information stored on the universal card 110 will not be accessible by another mobile device.

Another form of user authentication can be verification of something that the user knows. This can be a personal identification number (PIN), a unique identification of the user (such as a social security number), a fact about the user (such as the maiden name of the user's mother), a password, or anything else that the user can input. Yet another form of user authentication is something about the user. This can include a fingerprint, a voice identification, or other verifiable biometric.

While each of these forms of authentication can alone authenticate the user, it may be desirable to require at least two forms of authentication to ensure increased security. For example, the mobile device 100 and the universal card 110 may authenticate each other as being paired; however, this fact alone does not ensure that the person operating the devices is the authentic user. In this case, it may be advantageous to require the user to enter a password to verify that the user is authentic. In some instances, the issuer of the card may impose additional requirement depending on the circumstances that the card is being used. For example, if the card is being used to make a payment over a certain value, if the card is being used in a foreign country, or if the card issuer has reason to suspect that the use of the card is unauthorized, the issuer may require another level of authentication. In this case, if the initial authentication included pairing authentication and a user password, the issuer may require an additional biometric authentication.

Any user input required for authentication can be entered into either the universal card 110 or the mobile device 100. The universal card 110 may have a user interface (not shown), an optional biometric security device 118, or other input mechanism which allows the user to input the required value. Similarly the mobile device 100 may have a user interface 104, an optional biometric security device (not shown), or other input mechanism.

Once the user authentication 308 occurs (e.g., a password is entered), the authentication is verified 309 (the entered password is verified). If the authentication was not successful, user authentication 308 can be attempted again. If the authentication is successful, the user is prompted to select 310 an action for programming the universal card.

Notwithstanding the foregoing, it should be clear to a person skilled in the art that radio interfaces 120, 410, 430, 450, 510, and 520 may be subject to eavesdropping or other intrusive information breaches can be protected by data encryption technologies public key, private key and other known and standard methods of radio protection.

The universal card can be programmed in many ways, including three distinct modes. First, the universal card can be programmed in a "dummy card" mode, where the universal card does not itself store any of the information required for emulation of a traditional card. In this case, the user must use the mobile device to program the universal card for each use of the card. Once the universal card is used once as programmed, it would not retain that programmed setting, and it would require re-programming if it were to be used again. Second, the universal card can be programmed in a "temporary card" mode, where the universal card stores only one set of information required for emulation. The user utilizes the mobile device to program the card to emulate a specific card either for a set amount of time or number of transactions. Once programmed in this mode, the universal card would remain programmed to emulate that one card for the set time or the number of transactions. If the user wanted to change the universal card to emulate a different card, the user would need to reconnect the mobile device to reprogram the card. Third, the universal card can be programmed in a "default card" mode, where the universal card always emulates a specific card, unless programmed otherwise. In this mode, the information of the default card is saved in the universal card and the universal card is always configured to emulate the default card, unless the user re-programs the universal card to temporarily act as another card or to change to a new default card.

It may also be possible to program the universal card in different modes for the various ways in which the universal card can be used. For example, a universal card which has both a dynamic magnetic stripe and an NFC transceiver can be used to interface with both magnetic stripe readers and NFC-equipped terminals. The user may use the universal card as a public transportation pass which makes fare payments to an NFC-equipped terminal, and as a credit card with a magnetic stripe reader. In such a case the user may program the NFC transceiver to operate in a "default card" mode, always capable of emulating the public transportation pass, but program the dynamic magnetic stripe in a "dummy card" mode where the user must program the universal card with a specific credit card to emulate before each transaction.

Once the user selects 310 an action for programming, the data required for the programming action is determined 311. In order for the universal card to be programmed to emulate a magnetic stripe of a payment card, the universal card would need all the data required to be in the dynamic required stripe. The data could include all the information needed to fill Track 1 and Track 2, as discussed above and shown in Tables 1 and 2. The required data may be stored on the mobile device, the universal card, or a remote location such as a trusted service manager. If it is determined 312 that the required data is not available, the user is prompted to select 310 another action for programming.

If the required data is available, the universal card is programmed 314 to emulate the selected card with the required data. If the required data is stored only on the mobile device, the programming 314 will include transmitting the required data to the universal card via the short range communication link. If the required data is stored on the universal card, the programming 314 need only include configuring the appropriate device (e.g., dynamic magnetic stripe, short range transceiver, radio transmitter, etc) properly for emulation.

Figure 4:
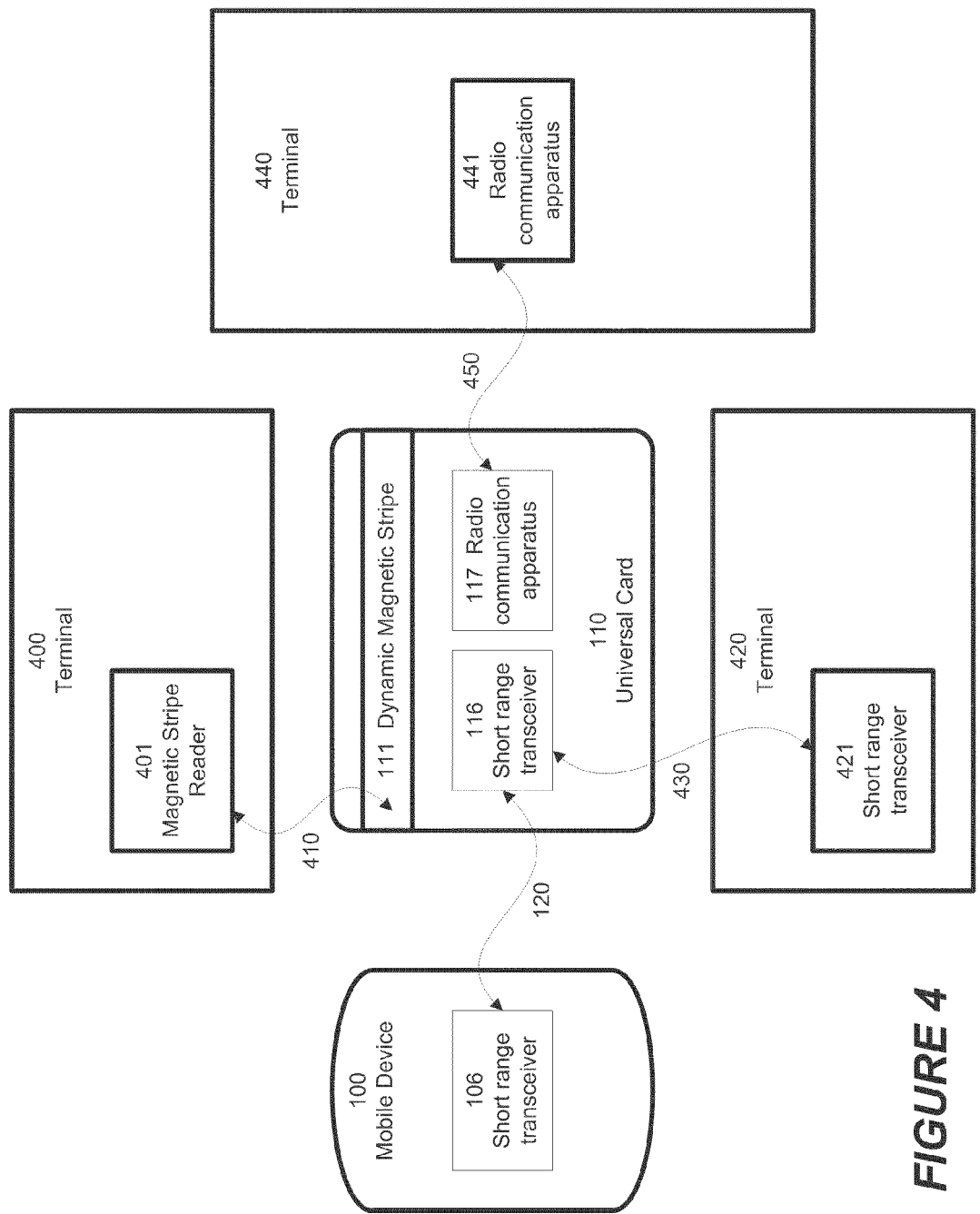
FIG. 4 depicts interactions between a mobile device and a universal card, and between a universal card and three different types of terminals.

Referring to FIG. 4, depicted are interactions between the mobile device 100 and the universal card 110, and between the universal card 110 and three different types of terminals 400, 420, and 440. As discussed above, the mobile device 100 communicates with the universal card 110 via a short range communications link 120 to program the universal card 110 for emulation of traditional cards. The universal card 110, in turn, can communicate with terminals 400, 420, and 440 in a number of ways. It is important to note that, once universal card 110 is programmed, the short range communications link 120 between the mobile device 100 and the universal card 110 need not be established for the universal card 110 to interact with the terminals 400, 420, and 440.

Terminal 400 is equipped with a magnetic stripe reader 401 which can read the dynamic magnetic stripe 111 of the universal card 110 when it is swiped 410 through the magnetic stripe reader 401. The magnetic stripe reader 401 can read any of the data written to the dynamic magnetic stripe 111. Terminal 420 is equipped with a short range transceiver 421 which can establish a short range communication link 430 between the universal card 110 and the terminal 420. Any required data can be transmitted from the universal card 110 to the terminal 420 via the short range communication link 430. Terminal 440 is equipped with a radio receiver 241 which can receive data sent from the radio transmitter 117 of the universal card 110. Any required data can be transmitted from the universal card 110 to the terminal 440 via the radio link 450.

One potential problem with the e-wallet software 105 on the mobile device 100 is that large amounts of information may need to be inputted into the e-wallet software 105. The user interface 104 may not be convenient for entry of the large amounts of information. Also, management of the information in the e-wallet software 105 may also not be convenient via the user interface 104. To address this issue, a personal computer 500 can be used.

Figure 5:
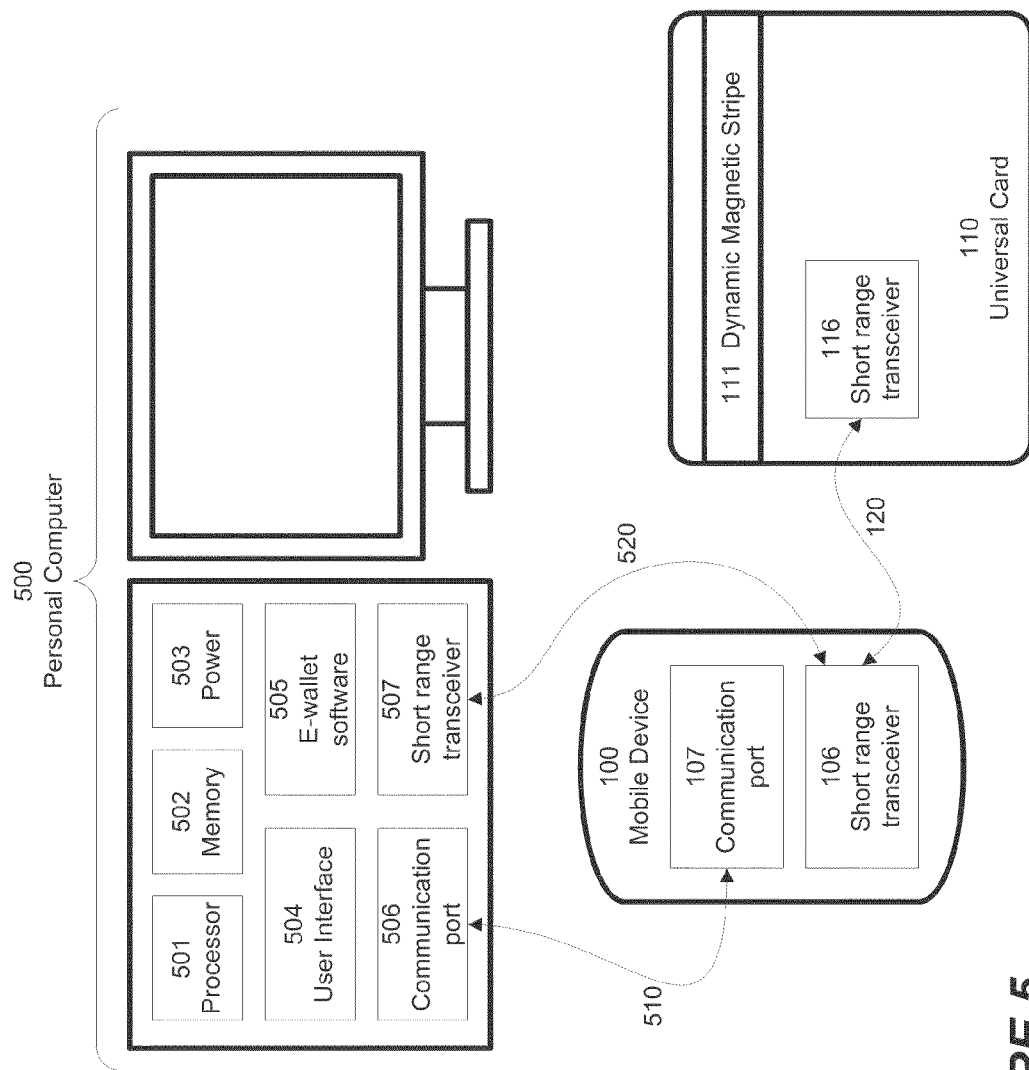
FIG. 5 depicts an exemplary system including a personal computer, a mobile device, and a universal card.

Referring to FIG. 5, depicted is an exemplary system including the personal computer 500, the mobile device 100, and the universal card 110. The personal computer can include a processor 501, memory 502, a power source 503, a user interface 504, the e-wallet software 505, and a communications port 506. The processor 501, memory 502, power source 503, and user interface 504 are all similar in function to the corresponding components of the mobile device 100, as discussed above. The e-wallet software 505 can be the same or similar to e-wallet software 105 of the mobile device 110. The user may enter data and manage the card data in e-wallet software 505 in the same way the user would use e-wallet software 105.

When the user enters data or makes changes in the management of e-wallet software 505, the e-wallet software 105 on the mobile device 100 must be updated to reflect the new and/or changed data. In order to make these updates, a communication link 510 can be established between the communication port 506 of the personal computer 500 and the communication port 107 of the mobile device 100. The communication link 510 can be any type of wired or wireless link, including a serial cable, a wired or wireless local area network (LAN), a wired or wireless wide area network (WAN), a short range communication link, a radio link, or any similar connection. Alternatively, a communication link 520 can be established between a short range transceiver 507 of the personal computer 500 and the short range transceiver 106 of the mobile device 100.

Once a communication link is established between the personal computer 500 and the mobile device 100, the data in e-wallet software 505 and the e-wallet software 105 can be synchronized. It is important to note that the short range communication link 120 between the universal card 110 and the mobile device 100 need not be active for the link 510 or the link 520 to be established between the personal computer 500 and the mobile device 100.

Figure 6:
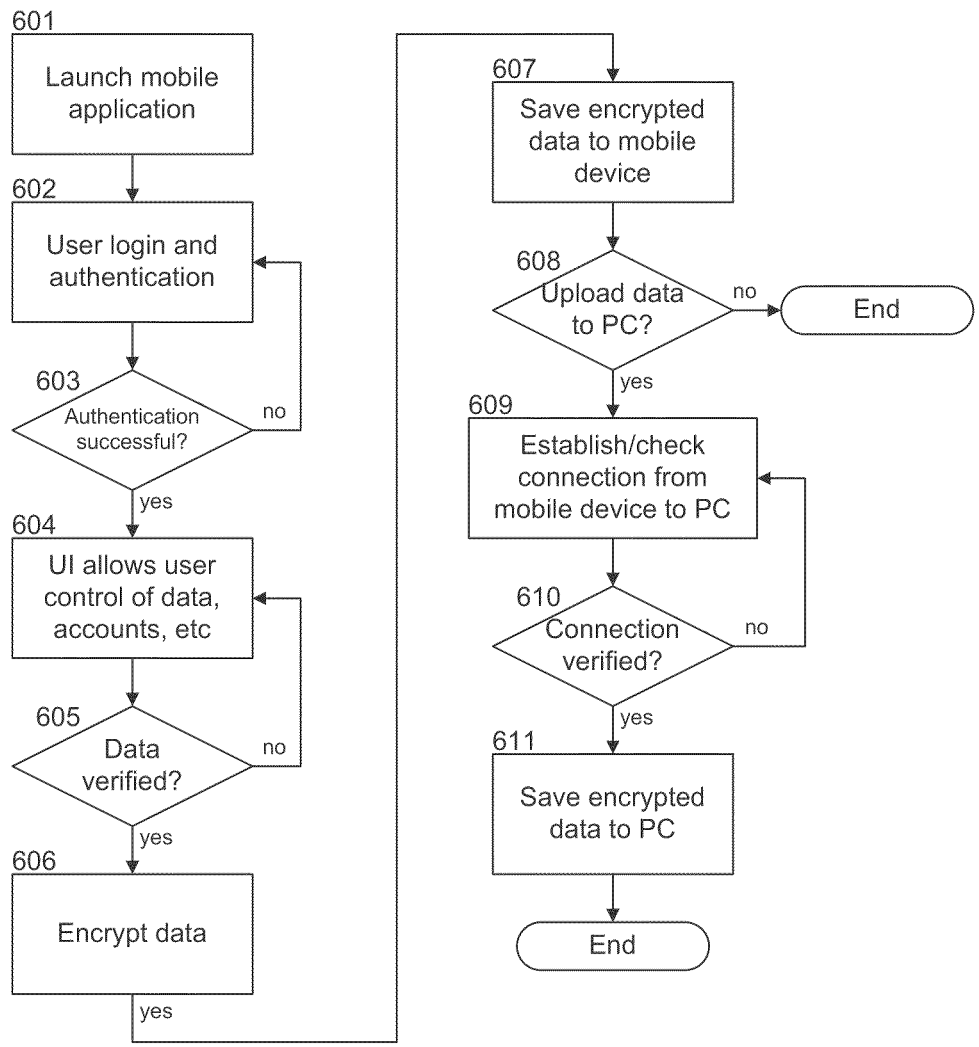
FIG. 6 depicts a flowchart process for managing universal card data using a mobile device.

Referring to FIG. 6, depicted is a flowchart process for managing universal card data using mobile device 100. The e-wallet software is launched 601 on the mobile device. Before the user is given access to the e-wallet software, the user must first login and be authenticated 602. Authentication here can be the same or similar to the forms of authentication discussed above. A determination is made whether the authentication is successful 603. If not successful, the user is prompted to login and authenticate 602 again. If the authentication is successful, the user is allowed to control 604 the e-wallet software a user interface of the mobile device.

The control 604 of the e-wallet software includes anything that the user may need to do to prepare for programming the universal card or to program the universal card. The user can enter data associated with a traditional card or with a financial account. The user can manage the entered data such as by naming a particular account or traditional card, setting a default card, or any other management action needed.

After the user enters data, the data is verified 605. The verification can include determining whether sufficient data has been entered for emulation of a traditional card, or whether the data entered matches the data of the card issuer. If the data is not verified, the user is allowed to reenter data 604. If the data is verified, the data is encrypted 606 for storage. Encrypting the data for storage is another form of security, as someone that gains access to the encrypted data cannot recover the entered data without knowing how to decrypt the encrypted data. After the data is encrypted, the encrypted data can be stored 607 to the mobile device.

A determination 608 is made as to whether the encrypted data should be uploaded to the personal computer. If the encrypted data will not be uploaded, no further action is required. If the encrypted data will be uploaded to the personal computer, the communication connection between the mobile device and the personal computer is either established or checked 609. If the connection to the computer is not verified 610, another attempt to establish 609 the connection can be attempted. Once the connection to the computer is verified 610, the encrypted data can be uploaded and saved 611 to the personal computer.

Figure 7:
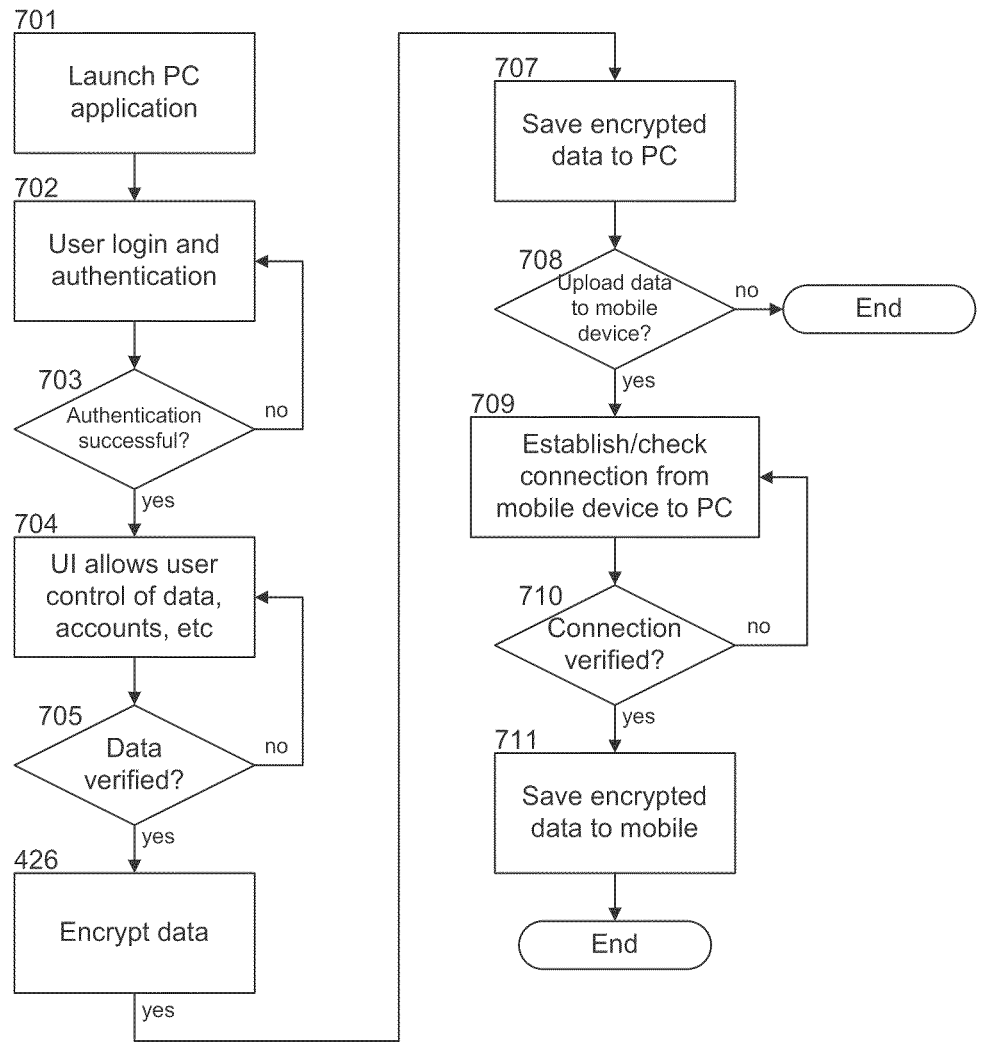
FIG. 7 depicts a flowchart process for managing universal card data using a personal computer.

Referring to FIG. 7, depicted is a flowchart process for managing universal card data using personal computer 500. Many of the steps are similar to those depicted in FIG. 6. The PC version of the e-wallet software is launched 701. The user goes through login and authentication 702 which is verified 703. Once the user authentication is verified, the user can control 704 the e-wallet software via a user interface of the personal computer. The control on the personal computer is the same as the control on the mobile device, except that the user may prefer to use the user interface of the personal computer to the user interface of the mobile device.

Data entered on the personal computer can be verified 705. Once verified, the data is encrypted 706 for storage. The encrypted data is stored 707 on the personal computer. A determination 708 is made as to whether the encrypted data should be uploaded to the mobile. If the encrypted data will not be uploaded to the mobile device, the no further action is required. If the encrypted data will be uploaded, the communication connection between the mobile device and the personal computer is either established or checked 709. If the connection to the computer is not verified 710, another attempt to establish 709 the connection can be attempted. Once the connection to the computer is verified 710, the encrypted data can be uploaded and saved 711 to the mobile device.

Figure 8A:
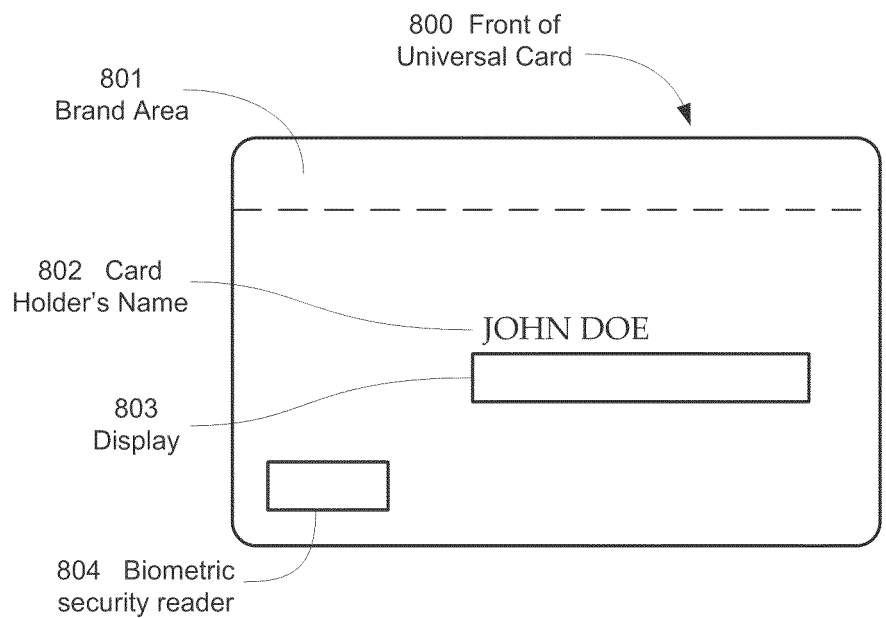
FIGS. 8A, 8B, 8C, and 8D depict possible designs for the front of a universal card.

The visible sides of a universal card may be designed in a number of ways to provide a user with access to information or components of the universal card. FIG. 8A depicts one design of the front of a universal card 800. The front of the universal card 800 can have a brand area 801 which can be used to identify the brand of the universal card issuer, the brand of a wireless carrier, the brand of a sponsor, any other brand, or any combination of those brands. The front of the universal card 800 can have the name of the card holder 802 on the face of the card to identify the user. The front of the universal card 800 can also have a display 803 which could be used at various times to display an account number, an expiration date, a card issuer logo, any other information, or any combination of these types of information. The front of the universal card 800 could also include a biometric security reader 804, such as a fingerprint reader, which is used to authenticate the user.

Figure 8B:
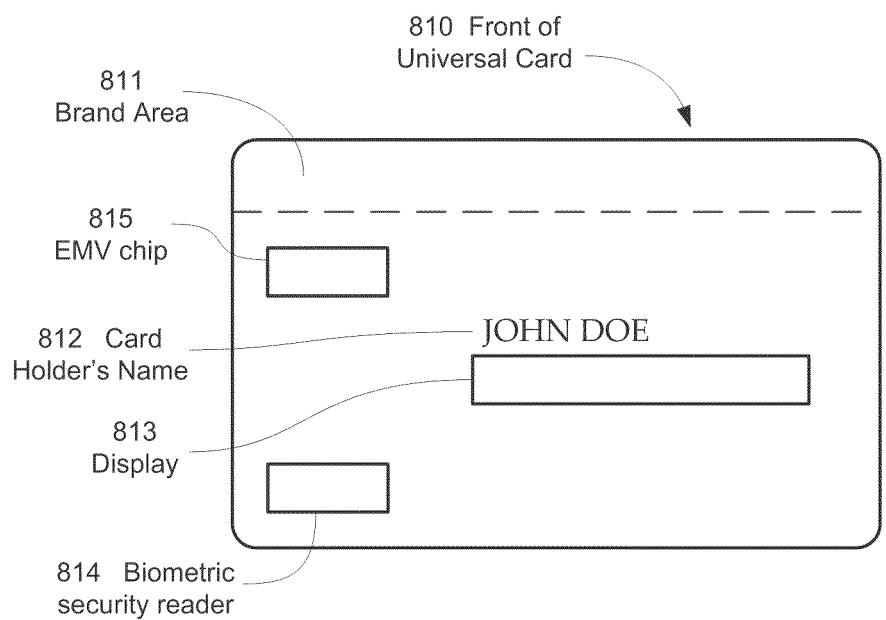
Figure 8C:
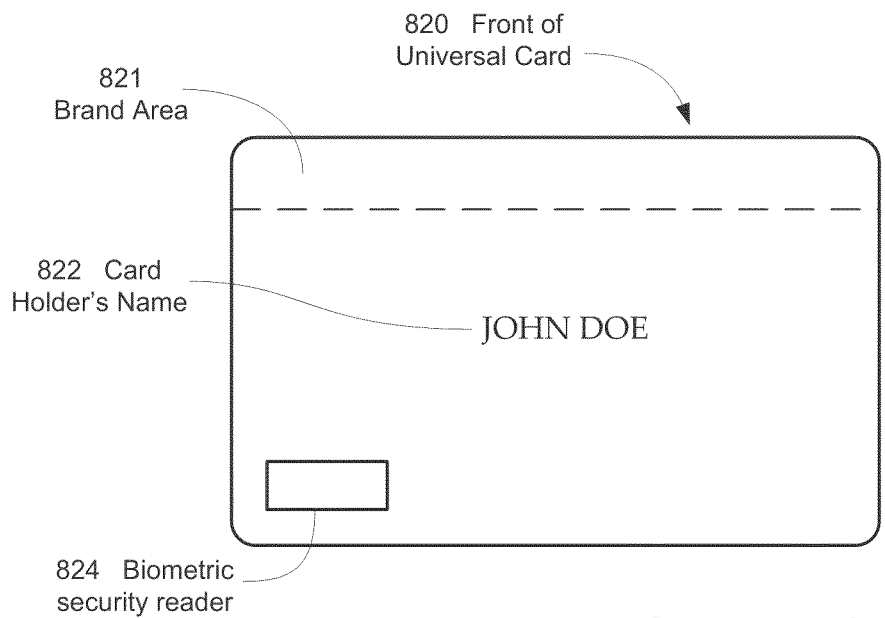
Figure 8D:
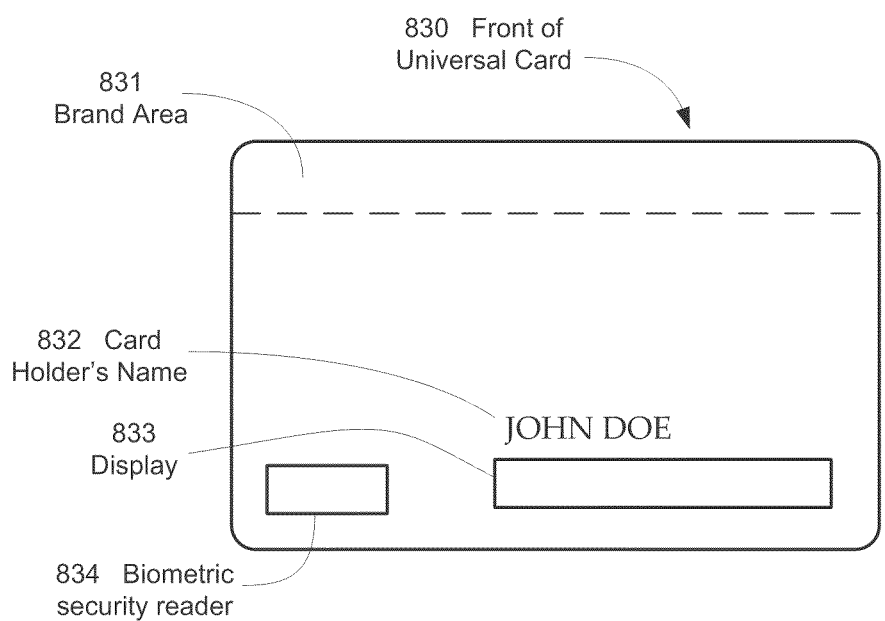

FIGS. 8B, 8C, and 8D depict other possible designs for the front of a universal card. FIG. 8B depicts the front of a universal card 810 which is similar to the front of universal card 800, including a brand area 811, the name of the card holder 812, a display 813, and a biometric security reader 814. The front of the front of the universal card 810 can also have an EMV chip 815 which is a required component of cards in some markets including some European markets. FIG. 8C depicts the front of a universal card 820 which is similar to the front of universal card 800, including a brand area 821, the name of the card holder 822, and a biometric security reader 824; however, the front of universal card 820 does not include a display. FIG. 8B depicts the front of a universal card 830 which similar to the front of universal card 800, including a brand area 831, the name of the card holder 832, a display 833, and a biometric security reader 834. The front of universal card 830 also shows that the name of the card holder 832 and the display 833 can be located in various locations on the front of a universal card.

Figure 9:
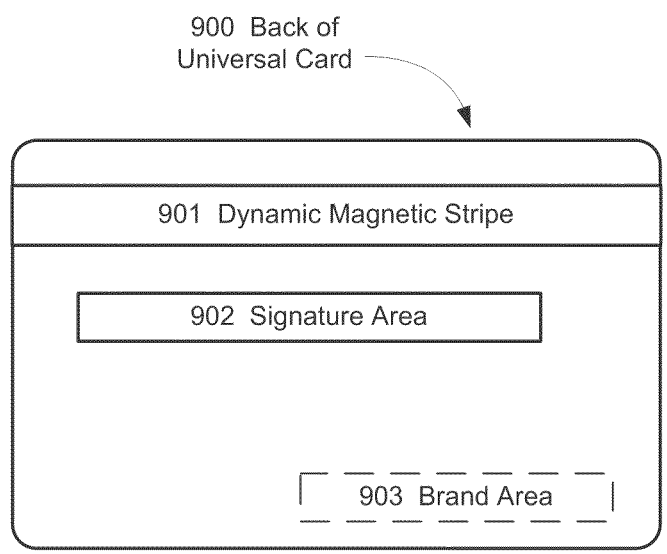
FIG. 9 depicts a possible design for the back of a universal card.

FIG. 9 depicts one design of the back of a universal card 900. The back of universal card 900 can include a dynamic magnetic stripe 901 for interacting with a terminal, a signature area 902 which displays the signature of the card holder, and a brand area 903. Similar to the brand area 801 described above, brand area 903 can be used to identify the brand of the universal card issuer, the brand of a wireless carrier, the brand of a sponsor, any other brand, or any combination of those brands.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The foregoing description has set forth various embodiments of the apparatus and methods via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the appended claims. Additional features of this disclosure are set forth in the following claims.

I claim:

1. A mobile device for instructing a universal card to emulate a traditional card for interacting with a terminal, the traditional card comprising a static data communication mechanism configured to pass card data to the terminal during a transaction, the mobile device comprising:
   a first processor, first memory, first power source, and first user interface;
   a first short range transceiver configured to connect to the universal card via a short range communication link;
   an e-wallet application executable by the first processor and configured to receive, via the first user interface, a user selection for instructing the universal card to emulate the traditional card, wherein the universal card comprises a dynamic data communication mechanism, a second power source, a second processor, a second memory, and a second short range transceiver, and wherein the dynamic data communication mechanism comprises a dynamic magnetic stripe; and
   wherein the mobile device is configured to transmit, to the universal card via the short range communication link, the card data and instructions for the universal card to configure the dynamic data communication mechanism, wherein the dynamic communication mechanism emulates the static data communication mechanism of the traditional card using the card data.

2. The mobile device of claim 1, wherein the first short range transceiver is a near field communication (NFC) transceiver.

3. The mobile device of claim 1, wherein the first short range transceiver is a Bluetooth transceiver.

4. The mobile device of claim 1, wherein the instructions comprise instructions for the universal card to configure the dynamic magnetic stripe to emulate a static magnetic stripe of the traditional card.

5. The mobile device of claim 1, wherein the instructions comprise instructions for the universal card to configure the second short range transceiver to emulate a short range transmitter of the traditional card.

6. The mobile device of claim 1, wherein the dynamic data communication mechanism further comprises a radio communications apparatus, and wherein the instructions comprise instructions for the universal card to configure the radio communications apparatus to emulate a radio communications apparatus of the traditional card.

7. The mobile device of claim 4, wherein the dynamic magnetic stripe is configured to pass the card data to a magnetic stripe reader of a terminal.

8. The mobile device of claim 5, wherein the second short range transceiver is configured to pass the card data to a third short range transceiver of a terminal.

9. The mobile device of claim 6, wherein the radio communications apparatus is configured to pass the card data to a radio receiver of a terminal.

10. The mobile device of claim 1, wherein the e-wallet application can be used to manage card data associated with a plurality of traditional cards.

11. The mobile device of claim 1, further comprising:
    a first communication port configured to communicate with a personal computer via a communication link;
    wherein the personal computer comprises:
       a second communication port configured to communicate with the mobile device via the communication link, and
       a PC e-wallet application configured to receive user inputs to manage the universal card;
    wherein the personal computer is configured to transmit the card data to the mobile device via the communication link.

12. The mobile device of claim 1, wherein the mobile device is configured to encrypt the card data prior to transmitting the card data to the universal card.

13. A universal card for emulating a traditional card, the traditional card comprising a static data communication mechanism configured to pass card data to a terminal during a transaction, the universal card comprising:
    a first short range transceiver configured to communicate with a mobile device via a short range communication link;
    a power source, processor, and memory; and
    a dynamic data communication mechanism configured to be instructed to emulate the static data communication mechanism of the traditional card to pass the card data to the terminal, wherein the dynamic data communication mechanism comprises a dynamic magnetic stripe;
    wherein the universal card is configured to communicate with the mobile device to:
       receive the card data from the mobile device, and
       receive instructions for the universal card to configure the dynamic data communication mechanism, wherein the dynamic communication mechanism emulates the static data communication mechanism of the traditional card using the card data; and
    wherein the universal card is configured to authenticate a user of the universal card before configuring the dynamic data communication mechanism.

14. The universal card of claim 13, wherein the dynamic data communication mechanism further comprises one of the following: a second short range transceiver, and a radio communications apparatus.

15. The universal card of claim 13, wherein the first short range transceiver is an NFC transceiver or a Bluetooth transceiver.

16. The universal card of claim 13, wherein authentication of the user comprises at least one of the following:
    verification of an identification of the mobile device;
    receipt of a predetermined input from the user;
    verification of a biometric characteristic of the user; and
    verification that the mobile device and the universal card are in physical proximity sufficient to establish the short range communication link.

* * * * *